US005570095A

United States Patent [19]
Drouilhet, Jr. et al.

[11] Patent Number: 5,570,095
[45] Date of Patent: Oct. 29, 1996

[54] AUTOMATIC DEPENDENT SURVEILLANCE AIR NAVIGATION SYSTEM

[75] Inventors: Paul R. Drouilhet, Jr., Arlington, Va.; George H. Knittel, Shirley; Vincent A. Orlando, Bedford, both of Mass.

[73] Assignee: Massachusetts Institute of Technology, Cambridge, Mass.

[21] Appl. No.: 222,633

[22] Filed: Apr. 1, 1994

[51] Int. Cl.$^6$ ........................................ G01S 5/02
[52] U.S. Cl. .................. 342/357; 342/455; 342/456; 364/436
[58] Field of Search ..................... 342/357, 455, 342/456; 364/436

[56] References Cited

U.S. PATENT DOCUMENTS

| | | | |
|---|---|---|---|
| 4,910,526 | 3/1990 | Donnangelo et al. | 342/455 |
| 5,153,836 | 10/1992 | Fraughton et al. | |
| 5,200,902 | 4/1993 | Pilley | |
| 5,334,982 | 8/1994 | Owen | 342/36 |
| 5,381,140 | 1/1995 | Kuroda et al. | 340/961 |
| 5,400,031 | 3/1995 | Fitts | 342/36 |

OTHER PUBLICATIONS

The Airsport Corporation, open letter dated Oct. 1991.
Nilsson, Johhny, "Time–Augmented GPS Aviation and Airport Applications in Sweden," *Civil Aviation*, Apr. 1992, pp. 38–42.
Beining, August, "Low Cost High Tech," *Sport Aviation*, Feb. 1993 pp. 36–39.
Beining, August, "Synchronous Garble Control," *Federal Aviation Administration NAS System Engineering Service*, Feb. 12, 1993, 3 pages pp. 36–39.

*Primary Examiner*—Thomas H. Tarcza
*Assistant Examiner*—Dao L. Phan
*Attorney, Agent, or Firm*—Testa, Hurwitz & Thibeault, LLP

[57] ABSTRACT

An automatic dependent surveillance (ADS) system for tracking aircraft includes a GPS navigation receiver for determining the position of an aircraft, a Mode S transponder for transmitting the position of the aircraft, and a Mode S receiving station for receiving the aircraft's position and for determining the position of the transmitting aircraft relative to other aircraft and the ground. The Mode S position information is broadcast as a squitter on a random time basis having a present average transmission rate, or in response to an interrogation signal from a Mode S receiving station. The Mode S receiver can be another aircraft, an en route ground station, and/or a terminal ground station. The en route ground station can include a multi-sector receiving antenna with each sector connected to a separate Mode S receiver. The terminal ground station can include an omni-directional antenna connected to a Mode S receiver. The Mode S transponder transmits a formatted message having airborne or surface position information including the type of GPS signal used to determine the aircraft's position, the latitude and longitude of the aircraft, the barometric altitude of the aircraft, the magnetic heading of the aircraft, and movement characteristics of the aircraft. The Mode S data link can convey differential GPS correction information to the aircraft.

13 Claims, 8 Drawing Sheets

| BITS | FIELD | RANGE |
|---|---|---|
| 3 | TYPE/FOM | EQUAL TO 1 |
| 5 | NOT USED | |
| | AIRCRAFT ID | |
| 6 | CHARACTER NO 1 | A/N |
| 6 | CHARACTER NO 2 | A/N |
| 6 | CHARACTER NO 3 | A/N |
| 6 | CHARACTER NO 4 | A/N |
| 6 | CHARACTER NO 5 | A/N |
| 6 | CHARACTER NO 6 | A/N |
| 6 | CHARACTER NO 7 | A/N |
| 6 | CHARACTER NO 8 | A/N |
| 56 | TOTAL | |

Fig. 8

AUTOMATIC DEPENDENT SURVEILLANCE AIR NAVIGATION SYSTEM

BACKGROUND OF THE INVENTION

The United States Government has certain rights in this application as the subject matter hereof was developed in part using funds from contract No. DTFA01-92-Z-02010.

The International Civil Aviation Organization (ICAO) has defined a concept for communications, navigation and surveillance for the next century known as the Future Air Navigation System (FANS). A cornerstone of the FANS is the increasing reliance on the use of satellite-based navigation systems such as the Global Positioning System (GPS). A second thrust of the FANS is surveillance based on the down linking of aircraft-derived satellite position information. This technique is known as Automatic Dependent Surveillance (ADS).

The general application of ADS will require that all aircraft in a region of airspace be equipped with satellite navigation equipment and some form of data link. Since such general equipage will take many years, early implementation is expected to take place in regions where other surveillance techniques are not practical, e.g., over ocean and in remote areas.

Many aircraft today are already equipped with Mode S transponder equipment which is capable of transmitting digitized information about the aircraft such as its identification and altitude. In the current Mode S design, a squitter is a 56-bit digital data transmission, broadcast on the Mode S radar beacon transponder reply frequency (1090 MHz). It is transmitted in an omni-directional fashion randomly in time averaging once per second.

This Mode S squitter is used by current Traffic Collision Avoidance Systems (TCAS) to detect the presence of other Mode S equipped aircraft. In operation, TCAS listens for Mode S squitters, extracts a 24-bit Mode S address contained in the squitter data and uses this address as the basis for further discrete interrogation of the Mode S transponder as required to perform surveillance on the aircraft.

Planning is currently underway for ADS to support Air Traffic Control (ATC) management of oceanic routes. Significant economic benefits are anticipated due to the reduction in aircraft separation (and the resultant capacity increase) made possible by ADS. This form of ADS connects an aircraft via a point-to-point link with the controlling oceanic ATC facility.

The application of ADS in other areas requires a more general form of ADS in which the aircraft broadcasts its position in an omni-directional fashion. This makes it possible for one ADS transmission to simultaneously serve the surveillance needs of multiple ground ATC and airborne collision avoidance activities.

SUMMARY OF THE INVENTION

This invention features an ADS-Mode S system that merges the capabilities of Automatic Dependent Surveillance and the Mode S secondary surveillance radars (commonly known as beacon radar or beacon surveillance). The result is an integrated concept for seamless surveillance of aircraft that permits equipped aircraft to participate in ADS or traditional beacon surveillance environments. This system offers many possibilities for transition from a beacon radar to an ADS-Mode S based environment.

In general, in one aspect, this invention features an automatic dependent surveillance system for tracking aircraft, including a navigation device, such as a GPS navigation receiver, for determining the position of an aircraft, a Mode S transponder for transmitting the position of the aircraft derived from the navigation device, and a Mode S receiving station for receiving the Mode S transmission of the aircraft's position and for determining the position of the transmitting aircraft relative to other aircraft and the ground.

In embodiments of this invention the Mode S position information is broadcast as a squitter on a random time basis having a present average transmission rate. The Mode S position information is also broadcast in response to an interrogation signal from a Mode S receiving station. The Mode S receiver can be another aircraft, an en route ground station, and/or a terminal ground station. The en route ground station can include a multi-sector receiving antenna with each sector connected to a separate Mode S receiver. The terminal ground station can include an omni-directional antenna connected to a Mode S receiver.

In still other embodiments of this invention, the Mode S transponder transmits a formatted message having airborne information including the type of GPS signal used to determine the aircraft's position in the air, the latitude and longitude of the aircraft as determined by the GPS, and the barometric altitude of the aircraft. The Mode S transponder also transmits a formatted message having surface information, including the type of GPS used to determine the aircraft's position on the ground, the latitude and longitude of the aircraft as determined by the GPS, the magnetic heading of the aircraft, and movement characteristics of the aircraft. The Mode S transponder can also include means for receiving a Mode S data link conveying differential GPS correction information for use by the GPS navigation receiver in determining the position of the aircraft.

BRIEF DESCRIPTION OF THE DRAWINGS

The foregoing and other objects, features and advantages of the invention would be apparent from the following more particular description of embodiments of the invention, as illustrated in the accompanying drawings, in which like reference characters refer to the same parts throughout the different views. The drawings are not necessarily to scale, emphasis instead being placed upon illustrating the principles of the invention.

FIG. 8 shows a detailed example of the identification format of FIG. 5.

DESCRIPTION OF THE PREFERRED EMBODIMENTS

Figure 1:
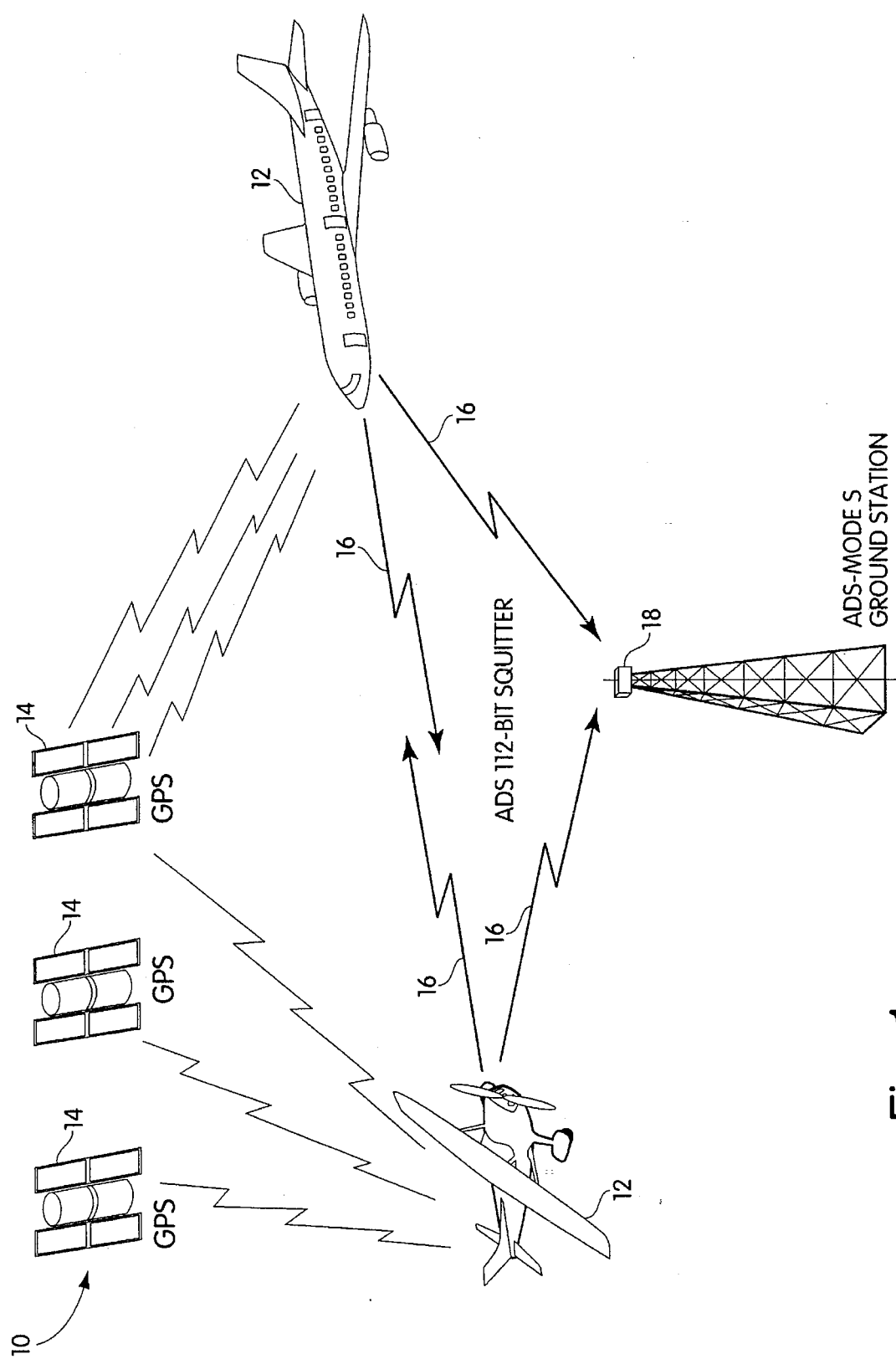
FIG. 1 shows an embodiment of an automatic dependent surveillance system of the present invention using Mode S transponders.

FIG. 1 shows an embodiment of an automatic dependent surveillance (ADS) system 10 of the present invention using Mode S transponders. ADS-Mode S is a systems approach that supports ADS and provides a number of surveillance and data link capabilities. Because Mode S is an internationally accepted operational system on the already-established radar beacon frequencies, there are no spectrum availability problems. ADS-Mode S has the capability to provide a natural transition from a beacon surveillance environment to a GPS-based surveillance environment. Mode S can support the transfer of ADS data with only minor modifications to existing equipment. Existing standards for Mode S and TCAS require only minor modifications to support the ADS-Mode S concept. The resulting system can use existing frequency allocations and can be located on existing FAA real estate. In addition to ADS, the concept enhances the operation of other beacon-based activities.

In operation, ADS-Mode S equipped aircraft 12 use GPS satellites 14 (or other position determining means) to determine their position on a regular basis, e.g., once every second. This position information is inserted into an ADS-Mode S message field and broadcast 16 as a squitter at random intervals having a predetermined average transmission rate, e.g., twice every second, to increase the probability of a successful reception by another aircraft or ground station. Simple omni-directional or sector beam ground stations 18 can receive the ADS-Mode S squitter to meet ground-to-air surveillance requirements. A ground station processor has a multisensor tracker that combines the output of the ADS-Mode S receivers with those of conventional beacon equipment in order to suppress duplicate reports and provide a correlated seamless surveillance stream to ATC users.

The ADS-Mode squitter can also be received by TCAS aircraft to support acquisition of Mode S aircraft as with the current squitter. The current 56-bit Mode S squitter is broadcast at an average rate of once per second for continued compatibility with current TCAS systems. The ADS-Mode S squitter can also provide other benefits to TCAS operation by providing positional information.

ADS-Mode S has applicability to surveillance activities beyond those required for beacon radars. These applications include air-to-ground en route, terminal and precision runway monitoring (PRM); surface runway and taxiway surveillance; and improved air-to-air TCAS and cockpit display of traffic information (CDTI).

In addition to the en route and terminal coverage required for beacon radar, ADS-Mode S also has the ability to support PRM surveillance requirements if the derived position of the aircraft is based on a special form of GPS known as differential GPS (DGPS) which compensates for GPS system errors and provides highly accurate positional information. On the surface, DGPS also supports surveillance on runways and taxiways.

Figure 2:
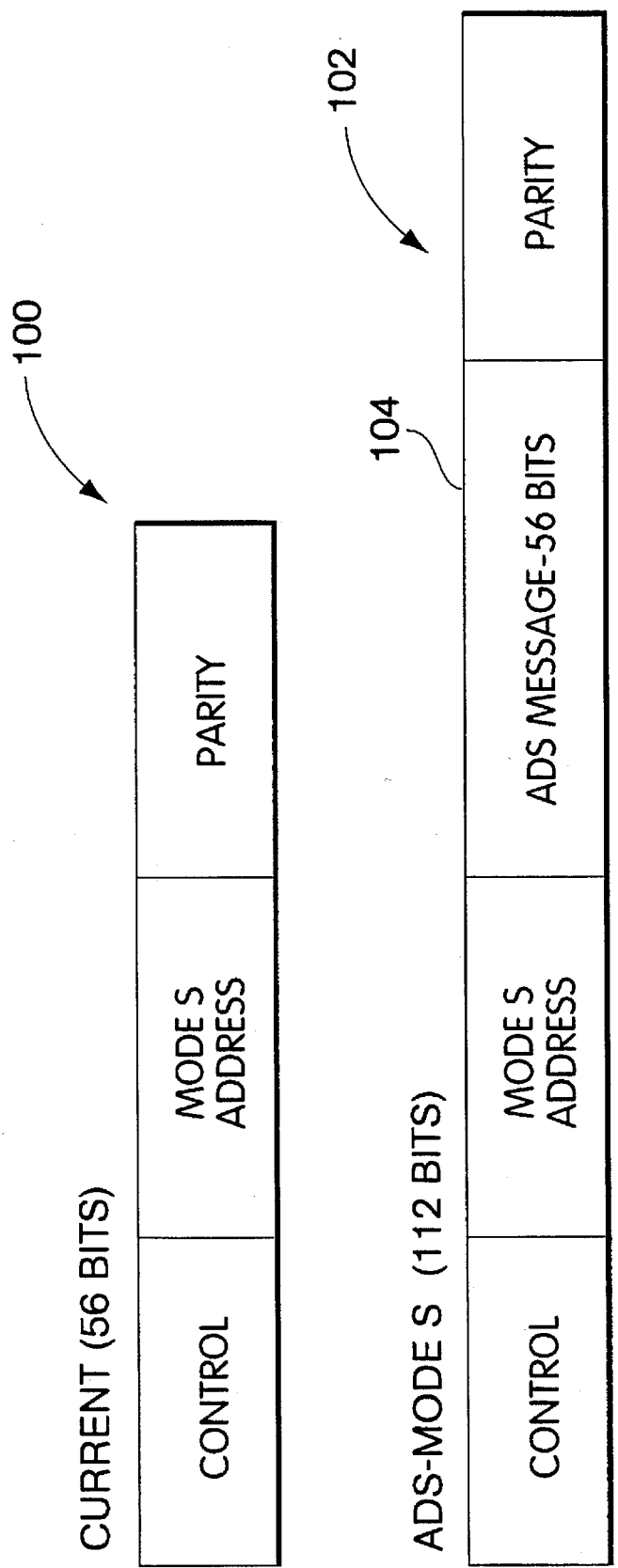
FIG. 2 shows the current 56-bit Mode S squitter format and the 112-bit ADS-Mode S squitter format of this invention.

FIG. 2 shows the current 56-bit Mode S squitter format 100 and an embodiment of a 112-bit ADS-Mode S squitter format 102 of the present invention. Because the current Mode S message protocol defines both 56-bit and 112-bit transponder replies, the present invention defines an additional squitter for ADS that uses a 112-bit format. This creates a 56-bit message field 104 for ADS position data. All other fields remain the same as in the original squitter format.

The inclusion of a Mode S transponder as part of the ADS-Mode S avionics means that ADS-Mode S equipped aircraft can also access the existing Mode S data link to utilize available services. This includes data link services provided by conventional Mode S ground sensors currently being put into operation. These Mode S sensors can provide data link service in the en route and terminal areas.

An additional form of Mode S data link device can provide service using simple omni-directional or sector beam antennas. For example, the Mode S uplink broadcast capability can be used to deliver ground-derived differential GPS corrections, using simple omni-directional ground based transmitters.

Air surveillance using ADS-Mode S in the en route area uses ground stations spaced 100 NM apart. Multiple ADS-Mode S stations will be required to replace a 200 NM beacon radar station now in use. However, these ADS-Mode S stations can provide better low altitude coverage than beacon radar. The 100 NM range of these ADS-Mode S ground stations provides flexibility of implementation and thus makes it possible to collocate these stations with existing FAA facilities, eliminating the need for the acquisition of additional sites. In the terminal area, a 50 NM ADS Mode S ground station will be able to replace a terminal beacon radar on a one-for-one basis.

Figure 3:
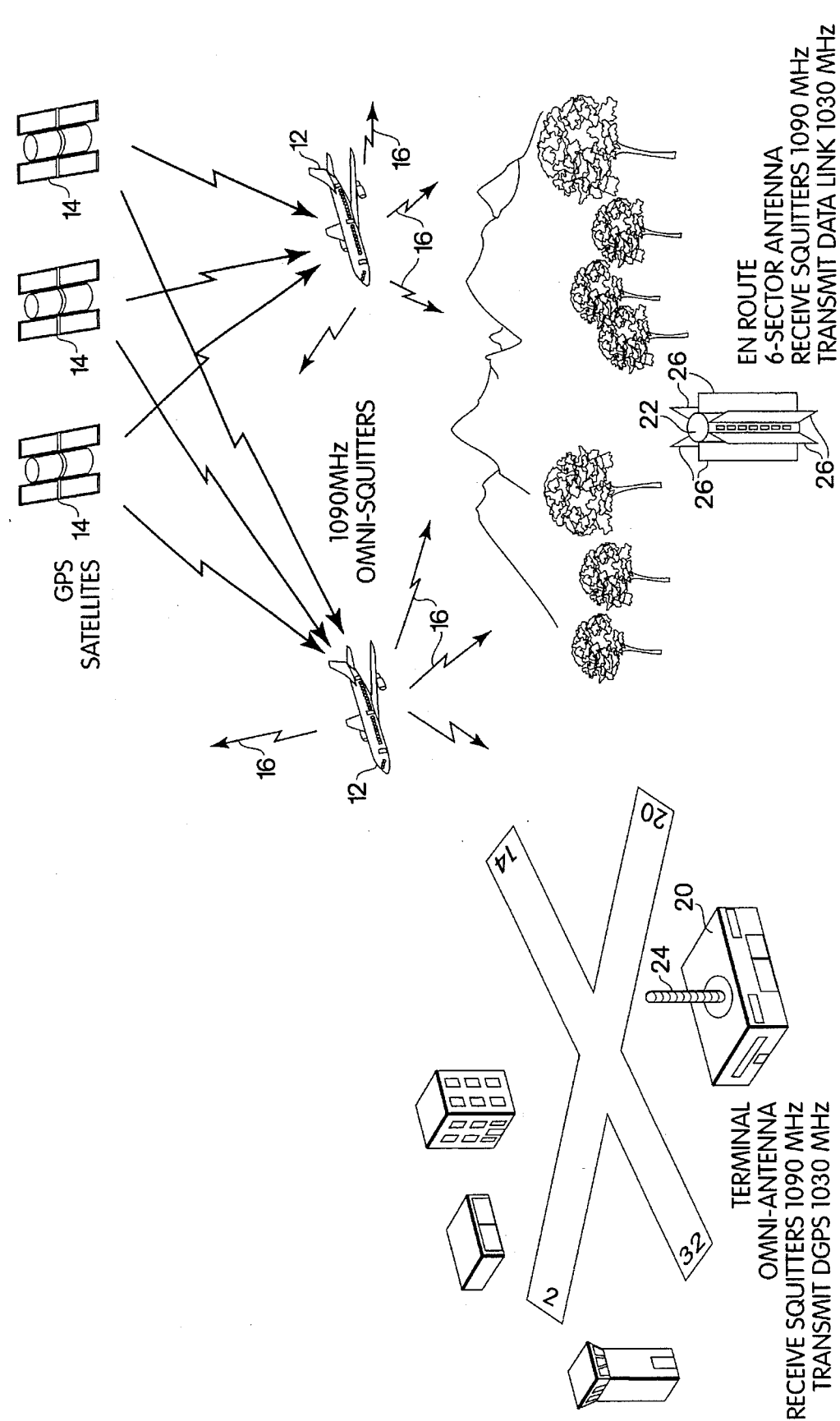
FIG. 3 shows the ADS-Mode S air surveillance operation possible with the ADS-Mode S transponder of this invention.

FIG. 3 shows an example of ADS-Mode S air surveillance operation. ADS-Mode S equipped aircraft 12 each determine their own position using GPS satellites 14 and broadcast 16 this position using the ADS-Mode S 1090 MHz squitter of this invention. The squitter broadcasts 16 can be received by terminal 20 and en route 22 ground stations depending on the location of the aircraft relative to the station. The terminal ground station 20 can use a single element omni-directional antenna 24, which is compatible with the required 50 NM range. The en route ground station 22 can use a multi-sector antenna 26 (with a corresponding receiver for each sector antennas) in order to obtain the required 100 NM range. The multi-sector antenna 26 is required to provide the antenna gain needed for 100 NM operation and is also needed to limit the number of aircraft being processed by any one receiver in order to operate into higher traffic densities. In one embodiment, the multi-sector antenna 26 can be a 6-sector antenna connected to 6 receivers, one for each sector.

The example of FIG. 3 shows that the ground stations are also able to transmit on the 1030 MHz Mode S data link frequency in order to provide Mode S data link service to the aircraft 12. For the terminal ground station 20, this can include the uplink broadcast of DGPS corrections to support PRM and the use of GPS-based non-precision approaches.

Figure 4:
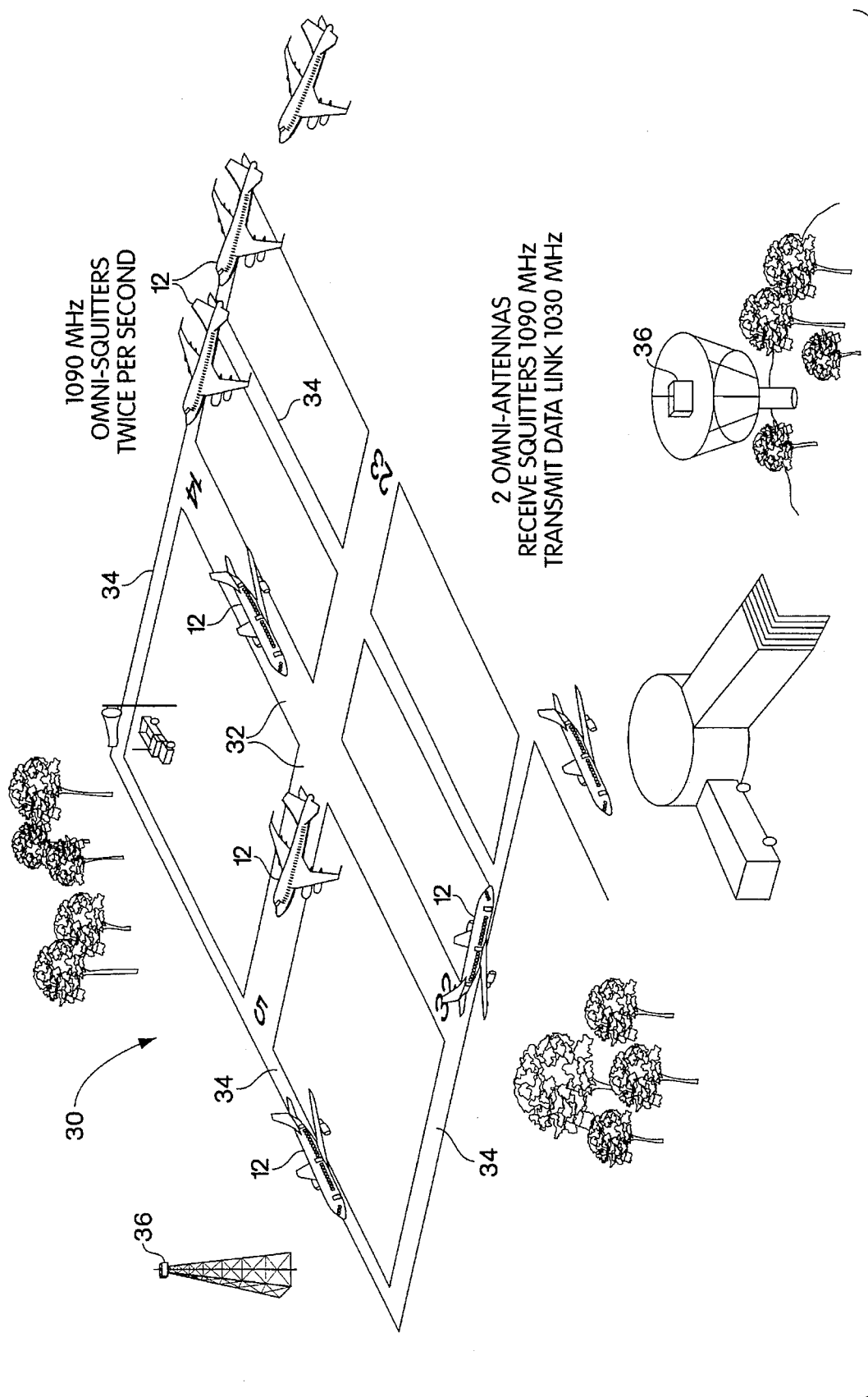
FIG. 4 shows the operation of the ADS-Mode S transponder of this invention on the airport surface to develop the position of aircraft and other vehicles.

FIG. 4 shows an example of the operation of ADS-Mode S on the airport surface 30. Aircraft 12 squitter their GPS derived positions while operating on runways 32 and taxiways 34. These ADS-Mode S squitters are received by omni-directional receiving stations 36 around the periphery of the airport. Two stations for this purpose are shown in FIG. 4, but more or less may be appropriate for a particular airport. The exact number will be determined by squitter reception performance in the multipath environment of the airport surface.

Airport surface surveillance requires the use of DGPS in order to obtain the required position accuracy. The DGPS correction is broadcast by Mode S data link to surface aircraft using the same ground stations 36 as used for squitter reception. The availability of a Mode S transmit capability in the ground stations also means that Mode S data link service can be used to provide a general purpose data link to aircraft in support of airport surface automation such as taxi instructions.

ADS-Mode S (using differential GPS) provides high accuracy and a once per second position update rate. Analysis indicates that a 20 NM operating range (adequate for PRM operations) can be supported. Directional antennas may be required in high interference environments. ADS-Mode S may provide a low cost alternative to the E-scan radar. It is more accurate than the E-scan at ranges greater than 2 NM.

The availability of position data in the ADS-Mode S squitter makes it possible to improve significantly the operation of TCAS. Because the present Mode S 56-bit squitter is retained with the ADS Mode S of this invention, TCAS can continue to operate without modification. In order to take advantage of ADS-Mode S data, TCAS can be modified to accept a long squitter data in addition to the short squitter data. This modification may require a software and/or hardware modification depending on the TCAS manufacture.

For security reasons, the U.S. Department of Defense intentionally perturbs the accuracy of GPS through a technique called "Selective Availability" or SA. Analysis of TCAS operation indicates that ADS-Mode S will be able to support passive surveillance of Mode S aircraft to a time to closest approach (Tau) of 40 seconds if SA is turned on (as it is today). Operational experience indicates that an intruder with a Tau of about 40 seconds is observed by TCAS on an average of once per hour per TCAS. Thus, TCAS will be able to perform most of its surveillance passively by listening to ADS-Mode S squitters.

If SA is turned off, TCAS will be able to perform all of its surveillance of Mode S aircraft passively. The only time that TCAS will be required to transmit a Mode S interrogation is when it is performing coordination for an avoidance maneuver. Experience indicates that this occurs only once every 45 hours per TCAS.

In addition to surveillance benefits, the use of the ADS position information can reduce the alert rate for "TCAS II" systems through the use of miss distance filtering. An additional benefit is that ADS-Mode S provides the basis for "TCAS IV" systems, a version of TCAS that issues horizontal avoidance maneuvers. The use of ADS position information from intruder aircraft should provide a more achievable basis for "TCAS IV" than the alternative of precision antennas to measure bearing angles to the intruder.

CDTI (Cockpit Display of Traffic Information) operation is similar to TCAS in that squitters are received air-to-air. A range of 14 NM can be supported for CDTI using receivers equivalent to those in TCAS. In low interference environments, this range can be extended to 40 NM through the use of low-noise receivers.

ADS-Mode S also provides useful benefits to existing beacon surveillance applications. For example, a single Mode S avionics set can provide both ADS and beacon radar capability. This provides compatibility with existing beacon radar installations as well as operation in regions using ADS as the primary surveillance technique. This interoperability permits a smooth transition from beacon radar to ADS environments.

Figure 5:
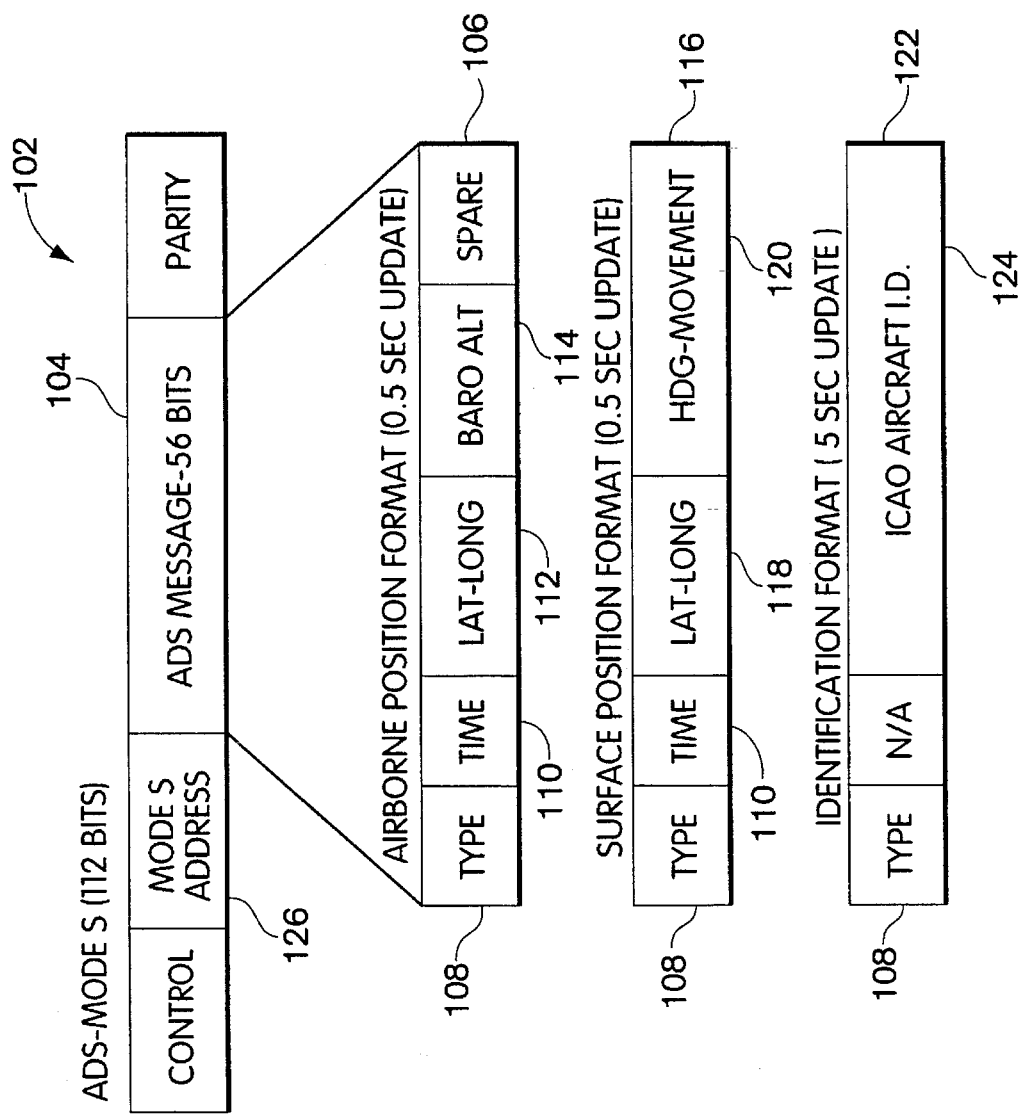
FIG. 5 shows an example of the ADS-Mode S message formats of this invention for airborne position, surface position and identification functions.

ADS-Mode S can also directly provide a low cost approach for the small terminal sensor. This sensor is intended for use in low traffic terminals that not qualify for conventional ground beacon equipment due to their high cost. Another natural application of ADS-Mode S is in the role of a gap filler for en route coverage. This can be of use in providing a fill in for low altitude coverage or for the monitoring of airways in remote areas. FIG. 5 shows an example of ADS-Mode S message formats for airborne position, surface position and identification functions.

An airborne position format 106 contains a 3-bit message type field 108, a one-bit time field 110, 19 bits each for latitude and longitude data 112, and 12 bits of barometric altitude data 114. A one-bit time field is sufficient because GPS units will be required to perform a position fix each second on a GPS second mark. Units that cannot support this timing will be required to extrapolate to the next GPS second mark. Since the squitter data is transmitted twice per second, the only ambiguity in the time of measurement is whether the measurement was made on the second just preceding the squitter, or in the previous second due to processing delays. A single bit that specifies an even or odd GPS second is sufficient to resolve this ambiguity. Latitude and longitude are provided to a resolution of 10 feet with a possible ambiguity of about 1000 NM well beyond the 100 NM range of the receiving station. Altitude is provided as encoded in the Mode S reply, and provides a nominal resolution of 25 feet.

A surface position format 116 contains a 3-bit message type field 108, a one-bit time field 110, 19 bits each for latitude and longitude data 118, and 14 bits of heading and movement data 120. Latitude-longitude data for the surface format field 118 replaces the two most significant bits of the airborne format field 112 with two additional least significant bits and thus provides a resolution of 2.5 feet and a position ambiguity of 250 NM which is not a factor for airport surface operation. In place of barometric altitude data 114, the surface format 116 provides information on heading and movement 120 of the aircraft on the airport surface.

An identification message format 122 contains a 3-bit message type field 108 and an ICAO Aircraft Identification field 124. Provision of the ICAO aircraft ID (e.g., AA 123) are necessary in support of TCAS and CDTI operations. Because aircraft ID rarely changes in flight, it is provided in this separate format on average once every 5 seconds. Note that the airborne and surface position formats and the identification format all contain the aircraft 24-bit Mode S address field 126 so there is no problem in associating the position data with the aircraft ID.

Figure 6:
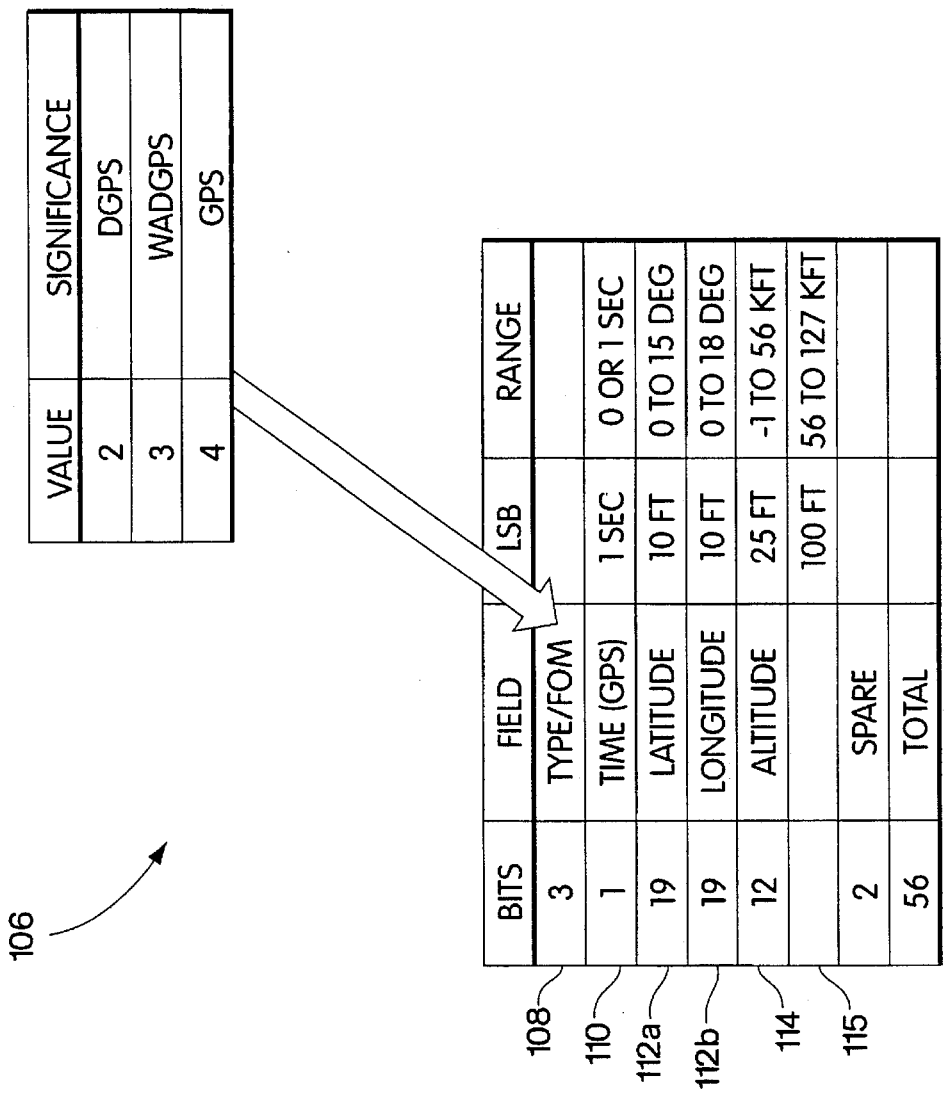
FIG. 6 shows a detailed example of the airborne position format of FIG. 5.

FIG. 6 shows an example of the airborne position format 106 of FIG. 5 in more detail. For the airborne position format, type field 108 can take values that identify the airborne format, as well as the type of GPS signal used to derive the position information contained therein. The GPS type information as shown includes GPS (4), DPGS (2) or wide area differential GPS (WADGPS) (3). Latitude 112a information can range from 0 to 15 degrees, and longitude 112b information can range from 0 to 18 degrees. In each case, the LSB of the latitude and longitude data is chosen to represent 10 foot increments. Barometric altitude information 114 can range from −1 to 56,000 feet in 25 foot increments, or 56,000 to 127,000 feet in 100 foot increments if an extra bit 115 is used to identify the altitude range.

Figure 7:
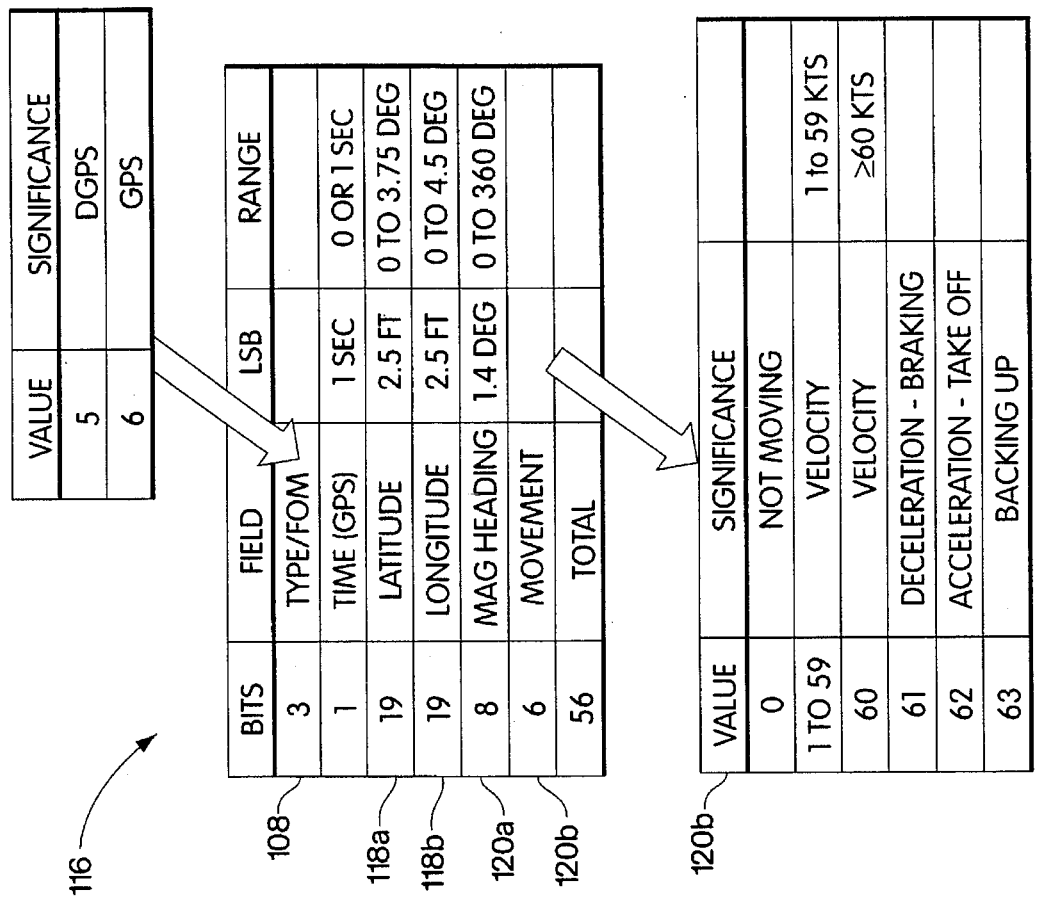
FIG. 7 shows a detailed example of the surface position format of FIG. 5.

FIG. 7 shows an example of the surface position format 116 of FIG. 5 in more detail. For the surface format, type field 108 can take values identifying the surface position format, as well as the type of GPS used to derive the surface position information contained therein, including DGPS (5)

and GPS (6). Latitude 118a information field can range from 0 to 3.75 degrees, and longitude 118b information field can range from 0 to 4.5 degrees. In each case, the LSB of the latitude and longitude data is chosen to represent 2.5 foot increments.

Heading and movement information field 120 is broken into an 8-bit magnetic heading field 120a which can range from 0 to 360 degrees of magnetic heading information gathered from on-board instruments, and a 6-bit movement information field 120b. It should be noted that true heading information could also be used. In the magnetic heading field 120a, the LSB represents 1.4 degree increments in heading. In the movement information field 120b, the data can take values representing the status of the aircraft as well as the velocity of the moving aircraft. For example, as shown, the value of 0 indicates that the aircraft is not moving. A value from 1 to 59 indicates the velocity of the aircraft from 1 to 59 knots, respectively. A value of 60 indicates a velocity of greater than 60 knots. A value of 61 indicates deceleration and braking, a value of 62 indicates acceleration at take-off, and a value of 63 indicates that the aircraft is backing up.

FIG. 8 shows an example of the aircraft identification format 122 of FIG. 5 in more detail. For the aircraft identification format, type field 108 is set equal to 1 and indicates the aircraft identification mode. The ICAO aircraft identification field 124 is broken into eight character fields, each containing 6-bits of data for identifying the alphanumeric ICAO aircraft identification.

An analysis of ADS-Mode S squitter impact on channel capacity was performed. If the additional ADS-Mode S squitter data transmission length is to present a problem, it would do so in a high density flight environment. Table 1 shows a worst case reply rate scenario for a single Mode S transponder on a per second basis.

TABLE 1

SQUITTER IMPACT ON CHANNEL OCCUPANCY
(REPLIES PER TRANSPONDER PER SECOND)

|  |  | OCCUPANCY (μSEC) |
|---|---|---|
| ATCRBS |  |  |
| GROUND | 100 | 2000 |
| MODE S |  |  |
| GROUND | 1 SHORT | 64 |
|  | 4 LONG | 480 |
| SQUITTER | 1 SHORT | 64 |
| ALL-CALL | 1 SHORT | 64 |
| TCAS | 5 SHORT | 320 |
|  |  | 2992 μSEC |
| CHANNEL OCCUPANCY (CURRENT SQUITTER) |  | 0.299% |
| CHANNEL OCCUPANCY (ADS SQUITTERS) |  | 0.326% |
| (ADDITIONAL 264 μSEC) |  |  |

For analysis of this worst case scenario, ground stations are assumed to interrogate the transponder at a total aggregate rate of 100 Air Traffic Control Radar Beacon System (ATCRBS) interrogations per second, leading to a reply channel occupancy of 2000 microseconds. Mode S activity, expected when all ground sensors are fully deployed in the next few years, adds an additional 992 microseconds as shown. The addition of two 112-bit ADS squitters per second adds 240 microseconds to the channel occupancy. The additional squitter for ID once per 5 seconds adds an average of 24 microseconds per second. The total increase in Mode S squitter occupancy for ADS of 264 microseconds per second increases the total channel occupancy for an ADS-Mode S over a current Mode S transponder from 0.299% to 0.326%. This is considered to be a tolerable increase in channel occupancy.

Because the use of the ADS-Mode S squitter will make it possible for TCAS and ATC surveillance systems to operate in a passive mode, it is possible to conclude that the use of the longer ADS squitter will have the effect of reducing the occupancy of the Mode S reply channel by reducing the number of Mode S interrogations.

The design baseline for squitter reception range was based on TCAS experience. Range improvements relative to TCAS can be accomplished through the use of improved antenna gain through vertical aperture and the use of horizontal sector beams. A second technique for enhanced range performance is the use of a receiver with a reduced noise figure. These improvements produce a conservative ADS squitter operating range of 50 NM using an omni-directional antenna and 100 NM using a 6-sector antenna. The resulting range is comparable to the performance of the present VHF data link.

In order to estimate the operating density for ADS-Mode S, another analysis was conducted which assumed that the probability of receiving a position update from an aircraft at least once every 5 seconds should be greater than or equal to 99.5%. This performance is representative of the current radar beacon surveillance system. The results are presented in Table 2 and discussed below.

TABLE 2

ADS/MODE S OPERATING DENSITY
5 SECOND UPDATE, RELIABILITY ≧ 99.5%

| | REPLIES/AIRCRAFT/SEC | | MAXIMUM AIRCRAFT IN RADIUS R | |
|---|---|---|---|---|
| | | | OMNI ANTENNA | 6-SECTOR ANTENNA |
| CASE | ATCRBS | MODE S | R = 150 NM | R = 250 NM |
| 1* | 120 | 14 | 85 | 215 |
| 2 | 60 | 14 | 140 | 350 |
| 3** | 0 | 14 | 280 | 700 |

*CURRENT HIGH DENSITY
**ALL MODE S WITH NOMINAL DATA LINK ACTIVITY

Case 1 - Current Highest Density

The first case analyzed is based on the worst case interference scenario used earlier, except that an additional load of 20 ATCRBS replies per second has been added for TCAS operation, and the number of Mode S replies per second has been increased to 14 to account for the ADS squitters. Note that this is an extreme worst case since it represents the highest ATCRBS transponder reply rates observed in the development of Mode S and TCAS, and includes an anticipated worst case for Mode S. Note also that approximately 75% of the ATCRBS replies elicited from the ground are due to military interrogators. This component of the interference scenario is expected to decrease as military activity is reduced.

Another worst case assumption is that every reply generated is received at a signal strength high enough to perturb the detection of the desired squitter. The Mode S reply uses pulse position modulation and is robust to interfering signals that are lower in power than the desired signal. Therefore, interference caused by replies from distant aircraft would be unlikely to interfere with the reception of a squitter from a nearby aircraft.

Even with these worst case assumptions, ADS-Mode S provides operation into the moderate densities shown in Table 2. Capacity values are given within a radius of 150 NM or 250 NM for the omni (terminal) and 6-sector (en route) case respectively, because these are the maximum ranges from which interfering replies can be received. This performance is adequate for the majority the required sites.

Case 2 - Current Medium Density

This case is more representative of the what would be observed in all but the highest density environments. The resulting operational density is appropriate for virtually all of the required sites.

Case 3 - All Mode S High Activity Environment

This case indicates the performance that would be achieved in an environment where ATCRBS fruit has been eliminated. The performance is compatible with the highest traffic density environments.

Thus, the ADS-Mode S squitter has the required message capacity and can operate on the 1090 MHz channel with negligible impact. ADS-Mode S can easily achieve the required operating ranges of 100 NM en route and 50 NM in the terminal area. Moderate traffic densities can be supported in high ATCRBS interference environments and the concept can operate into the highest traffic densities if ATCRBS fruit is reduced. Reduction of ATCRBS fruit levels will involve coordination with military users. Note that military adoption of the ADS-Mode S concept would lead to a substantial decrease in ATCRBS fruit While this invention has been particularly shown and described to embodiments thereof, it would be understood by those skilled in the art that various changes in form and detail may be made therein without departing from the spirit and scope of the invention as defined by the appended claims. For example, although the invention described herein uses the GPS navigation system, other navigation position sources available now or developed in the future could also be used. Although specific Mode S transmission formats have been described, other formats could also be defined to practice this invention.

What is claimed is:

1. An automatic dependent surveillance system for tracking aircraft, comprising;
   a navigation device for determining the position of an aircraft;
   a Mode S transponder for transmitting the position of the aircraft, derived from the navigation device, as a squitter on a random time basis having a preset average transmission rate; and
   a Mode S receiving station for receiving the Mode S transmission of the aircraft position and for determining the position of the aircraft relative to other aircraft and the ground.

2. The automatic dependent surveillance system of claim 1, wherein the navigation device comprises a GPS navigation receiver.

3. The automatic dependent surveillance system of claim 1, wherein the Mode S transponder also transmits the Mode S position information in response to an interrogation signal from a Mode S receiving station.

4. The automatic dependent surveillance system of claim 1, wherein the Mode S receiving station comprises another aircraft.

5. The automatic dependent surveillance system of claim 1, wherein the Mode S receiving station comprises an en route ground station.

6. The automatic dependent surveillance system of claim 5, wherein the en route ground station comprises a multi-sector receiving antenna with each sector connected to a separate Mode S receiver.

7. The automatic dependent surveillance system of claim 1, wherein the Mode S receiving station comprises a terminal ground station.

8. The automatic dependent surveillance system of claim 7, wherein the terminal ground station comprises an omnidirectional antenna connected to a Mode S receiver.

9. The automatic dependent surveillance system of claim 1, wherein the Mode S transponder also transmits a formatted message comprising airborne information including the type of navigation device used to determine the aircraft position, the accuracy of the aircraft position, the velocity of the aircraft, and the barometric altitude of the aircraft.

10. The automatic dependent surveillance system of claim 1, wherein the Mode S transponder also transmits a formatted message comprising surface information including the type of navigation device used to determine the aircraft position, the accuracy of the aircraft position, the magnetic heading of the aircraft, the velocity of the aircraft, and movement characteristics of the aircraft.

11. The automatic dependent surveillance system of claim 2, wherein the Mode S transponder includes means for receiving a Mode S data link conveying differential GPS correction information for use by the GPS navigation receiver in determining the position of the aircraft.

12. The automatic dependent surveillance system of claim 5, wherein the en route ground station comprises an omni-directional antenna connected to a Mode S receiver.

13. The automatic dependent surveillance system of claim 7, wherein the terminal ground station comprises a multi-sector receiving antenna with each sector connected to a separate Mode S receiver.

* * * * *